(12) United States Patent
Fan et al.

(10) Patent No.: US 12,025,873 B2
(45) Date of Patent: Jul. 2, 2024

(54) SPLICED PANEL

(71) Applicant: TCL CHINA STAR OPTOELECTRONICS TECHNOLOGY CO., LTD., Guangdong (CN)

(72) Inventors: Yongping Fan, Guangdong (CN); Feng Zheng, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/622,800

(22) PCT Filed: Dec. 16, 2021

(86) PCT No.: PCT/CN2021/138912
§ 371 (c)(1),
(2) Date: Dec. 25, 2021

(87) PCT Pub. No.: WO2023/103020
PCT Pub. Date: Jun. 15, 2023

(65) Prior Publication Data
US 2024/0036376 A1 Feb. 1, 2024

(30) Foreign Application Priority Data
Dec. 7, 2021 (CN) .......................... 202111486712.5

(51) Int. Cl.
*G02F 1/1333* (2006.01)
*G02F 1/13357* (2006.01)
(Continued)

(52) U.S. Cl.
CPC .... *G02F 1/13336* (2013.01); *G02F 1/133317* (2021.01); *G02F 1/133328* (2021.01);
(Continued)

(58) Field of Classification Search
CPC .......... G02F 1/13336; G02F 1/133317; G02F 1/133328; G02F 1/133603; G09F 9/3026; G09F 9/35
See application file for complete search history.

(56) References Cited

U.S. PATENT DOCUMENTS

2002/0163301 A1  11/2002  Morley et al.
2016/0238785 A1   8/2016  Park
(Continued)

FOREIGN PATENT DOCUMENTS

CN   104464557 A   3/2015
CN   207353253 U   5/2018
(Continued)

OTHER PUBLICATIONS

English Machine Translation of Li, CN 113160714 (Year: 2023).*
(Continued)

*Primary Examiner* — Donald L Raleigh
(74) *Attorney, Agent, or Firm* — PV IP PC; Wei Te Chung; Zhigang Ma

(57) ABSTRACT

A spliced panel is disclosed. At least two display panels are spliced to each other. Each of the at least two display panels includes a bending part and a non-bending part. The bending part is bent from a side of the non-bending part to a back surface of the at least two display panels. The non-bending part is configured to display an image. In the at least two display panels spliced to each other, the bending part of one of the at least two display panels is correspondingly spliced to the bending part of another of the at least two display panels to form a support structure. A light-emitting diode (LED) substrate is disposed on the support structure.

17 Claims, 4 Drawing Sheets

(51) Int. Cl.
  *G09F 9/302* (2006.01)
  *G09F 9/35* (2006.01)
(52) U.S. Cl.
  CPC ...... *G02F 1/133603* (2013.01); *G09F 9/3026* (2013.01); *G09F 9/35* (2013.01)

(56) References Cited

U.S. PATENT DOCUMENTS

| | | | |
|---|---|---|---|
| 2020/0251457 A1 | 8/2020 | Huang et al. | |
| 2021/0027670 A1* | 1/2021 | Chou | G09F 9/301 |
| 2021/0072579 A1 | 3/2021 | Kim et al. | |
| 2022/0244605 A1* | 8/2022 | Zhang | G06F 1/1656 |

FOREIGN PATENT DOCUMENTS

| | | | | |
|---|---|---|---|---|
| CN | 111290154 | A | | 6/2020 |
| CN | 111369900 | A | | 7/2020 |
| CN | 111584475 | A | | 8/2020 |
| CN | 111653207 | A | | 9/2020 |
| CN | 212161167 | U | | 12/2020 |
| CN | 112382212 | A | | 2/2021 |
| CN | 113031338 | A | | 6/2021 |
| CN | 113160701 | A | | 7/2021 |
| CN | 113160714 | A | | 7/2021 |
| CN | 113160714 | A | * | 7/2021 ............. G09F 9/302 |
| CN | 113658518 | A | * | 11/2021 ............. G09F 9/302 |
| CN | 113703211 | A | | 11/2021 |
| IN | 113658518 | A | | 11/2021 |
| JP | 2005031247 | A | | 2/2005 |
| JP | 2016532139 | A | | 10/2016 |

OTHER PUBLICATIONS

English Machine Translation of Huang et al , Chinese Pub. No. CN113658518 (Year: 2023).*
International Search Report in International application No. PCT/CN2021/138912,mailed on Jun. 27, 2022.
Written Opinion of the International Search Authority in International application No. PCT/CN2021/138912,mailed on Jun. 27, 2022.
Chinese Office Action issued in corresponding Chinese Patent Application No. 202111486712.5 dated Jun. 30, 2022, pp. 1-9.
Japanese Office Action issued in corresponding Japanese Patent Application No. 特願2021-576694 dated Jan. 29, 2024, pp. 1-8.

* cited by examiner

SPLICED PANEL

FIELD

The present disclosure relates to a field of display technologies, and more particularly, to a spliced panel.

BACKGROUND

With rapid development of outdoor displays in market, the outdoor displays having large scale and high resolution have become a development direction. Conventional display panels have low cost and high resolution. However, a splicing gap between conventional display panels cannot be eliminated, affecting a visual experience. As to mini light-emitting diodes (mini LEDs), and micro LEDs, they cannot rival liquid crystal display (LCD) panels in resolution cost thereof is overly high. Therefore, it is urgent to solve an issue of splicing gaps of spliced LCD panels.

SUMMARY

An embodiment of the present disclosure provides a display panel, which can solve a following issue: a display effect of spliced panels is bad due to a splicing gap.

An embodiment of the present disclosure provides a spliced panel, comprising:
  at least two display panels spliced to each other, wherein each of the at least two display panels comprises a bending part and a non-bending part, the bending part is bent from a side of the non-bending part to a back surface of the display panel, the non-bending part is configured to display an image, the bending part of one of the at least two display panels and the bending part of another of the at least two display panels are correspondingly spliced to each other to form a support structure, each of the at least two display panels comprises a first substrate and a second substrate disposed on the first substrate, the first substrate comprises a first base, and the first base is a rigid base or a flexible base; and
  a light-emitting diode (LED) substrate disposed on the support structure.

Optionally, in some embodiments, the non-bending part is higher than the support structure, a surface of the non-bending part of the at least two display panels spliced to each other and a surface of the support structure form a recess, and the LED substrate is disposed in the recess.

Optionally, in some embodiments, a lateral surface of the LED substrate is connected to the non-bending part by a black adhesive.

Optionally, in some embodiments, the first substrate comprises a first flexible layer, the first flexible layer is disposed on a surface of the first base facing the second substrate, the first flexible layer comprises a first sub-layer protruding from the first base, and the first sub-layer is bent to be part of the bending part; and
  a lateral surface of the first base of the at least two display panels spliced to each other and a surface of the first sub-layer of the at least two display panels spliced to each other to form the recess.

Optionally, in some embodiments, a second flexible layer is disposed on a surface of the second base facing the first substrate, a driving circuit layer is disposed on a surface of the second flexible layer facing the first substrate, the second flexible layer comprises a second sub-layer protruding from the second base, and part of the driving circuit layer corresponding to the second sub-layer and the second sub-layer are bent to be part of the bending part.

Optionally, in some embodiments, each of the at least two display panels comprises a liquid crystal and a frame sealant, the liquid crystal and the sealant are disposed between the first substrate and the second substrate, the frame sealant is disposed surrounding the liquid crystal to encapsulate the liquid crystal, and the non-bending part comprises the liquid crystal.

Optionally, in some embodiments, the bending part comprises the liquid crystal.

An embodiment of the present disclosure further relates to a spliced panel, comprising:
  at least two display panels spliced to each other, wherein each of the at least two display panels comprises a bending part and a non-bending part, the bending part is bent from a side of the non-bending part to a back surface of the display panel, the non-bending part is configured to display an image, and the bending part of one of the at least two display panels and the bending part of another of the at least two display panels are correspondingly spliced to each other to form a support structure; and
  a light-emitting diode (LED) substrate disposed on the support structure.

Each of the at least two display panels is bent to form the bending part, and two bending parts are spliced to each other to form the support structure. Then, the LED substrate is disposed on the support structure, thereby covering a splicing gap. Therefore, the splicing gap will not be viewed. In addition, a non-display functional layer of each of the at least two display panels is bent to the back surface of the at least two display panels, thereby narrowing a frame.

Optionally, in some embodiments, the non-bending part is higher than the support structure, a surface of the non-bending part of the at least two display panels spliced to each other and a surface of the support structure form a recess, and the LED substrate is disposed in the recess.

The LED substrate is disposed in the recess, thereby improving flatness of the spliced panel.

Optionally, in some embodiments, a lateral surface of the LED substrate is connected to the non-bending part by a black adhesive.

By disposing the black adhesive between the lateral surface of the LED substrate and the non-bending part, not only can the LED substrate be stably disposed in the recess, but also a light-shielding effect can be improved. Therefore, a display contrast is enhanced.

Optionally, in some embodiments, the first substrate comprises a first flexible layer, the first flexible layer is disposed on a surface of the first base facing the second substrate, the first flexible layer comprises a first sub-layer protruding from the first base, and the first sub-layer is bent to be part of the bending part; and
  a lateral surface of the first base of the at least two display panels spliced to each other and a surface of the first sub-layer of the at least two display panels spliced to each other to form the recess.

The recess can be simply disposed in this structure.

Optionally, in some embodiments, a second flexible layer is disposed on a surface of the second base facing the first substrate, a driving circuit layer is disposed on a surface of the second flexible layer facing the first substrate, the second flexible layer comprises a second sub-layer protruding from the second base, and part of the driving circuit layer corresponding to the second sub-layer and the second sub-layer are bent to be part of the bending part.

The bending part can be formed in this structure.

Optionally, in some embodiments, each of the at least two display panels comprises a liquid crystal and a frame sealant, the liquid crystal and the sealant are disposed between the first substrate and the second substrate, the frame sealant is disposed surrounding the liquid crystal to encapsulate the liquid crystal, and the non-bending part comprises the liquid crystal.

Optionally, in some embodiments, the bending part comprises the liquid crystal.

That is, part of the at each two display panels originally disposed in the display area is the bending part, thereby narrowing a frame. In addition, by setting a display art of the at least two display panels to be the bending part, a bending radius of the bending part can be reduced.

Optionally, in some embodiments, the bending part comprises the frame sealant.

That is, the liquid crystal and the sealant are disposed in the bending part. This structure can increase a display area of the at least two display panels.

Optionally, in some embodiments, the bending part comprises the sealant and does not comprise the liquid crystal.

That is, only part of the non-display area of the spliced panel is bent. Therefore, a display area of the at least two display panels is increased, and a risk of light leakage of the spliced panel is further reduced.

Optionally, in some embodiments, the first substrate comprises a black matrix layer disposed on a surface of the first flexible layer facing the second substrate, and a gap is defined between the LED substrate and the first base; and part of the black matrix layer covers the gap.

The gap between the LED substrate and the first base are covered by the black matrix layer, thereby preventing light leakage.

Optionally, in some embodiments, each of the at least two display panels comprises a first substrate and a second substrate disposed on the first substrate, the first substrate is a cover plate, the second substrate comprises a base, and a flexible layer, a driving circuit layer, a display functional layer, and an encapsulation layer sequentially disposed on the base, the first substrate is disposed on the display functional layer, and the flexible layer comprises a sub-layer protruding from the base;

the base, part of the flexible layer, part of the driving circuit layer, part of the display functional layer, part of the encapsulation layer, and the first substrate are part of the non-bending part, and part of the driving circuit layer corresponding to the sub-layer and the sub-layer are bent to be part of the bending part; and in the at least two display panels spliced to each other, an upper surface of two driving circuit layers, a lateral surface of two encapsulation layers, and a lateral surface of two first substrates form the recess.

Optionally, in some embodiments, a depth of the recess is greater than a thickness of the LED substrate, and a filling adhesive is filled in the recess and covers the LED.

Optionally, in some embodiments, a refractive index of the filling adhesive is equal to a refractive index of the first substrate.

In the spliced panel provided by the present embodiment, the display panels are LED panels. It is allowed to only cut part of the base corresponding to the bending area, thereby simplifying manufacturing steps and further reducing a difference of an image displayed by the display panels and the LED substrate.

Regarding the beneficial effects:

An embodiment of the present disclosure provides a spliced panel, including at least two display panels and an LED substrate. The at least two display panels are spliced to each other. Each of the at least two display panels comprises a bending part and a non-bending part. The bending part is bent from a side of the non-bending part to a back surface of the display panels. The bending part of one of the at least two display panels is correspondingly spliced to the bending part of another of the at least two display panels to form a support structure. The LED substrate is disposed on the support structure.

In the spliced panel provided by the present embodiment, each of the at least two display panels is bent to form the bending part, and two bending parts are spliced to each other to form the support structure. Then, the LED substrate is disposed on the support structure, thereby covering a splicing gap. Therefore, the splicing gap will not be viewed. In addition, a non-display functional layer of each of the at least two display panels is bent to the back surface of the at least two display panels, thereby narrowing a frame.

DESCRIPTION OF DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which those skilled in the art can derive further figures without making any inventive efforts.

DETAILED DESCRIPTION

Figure 1:
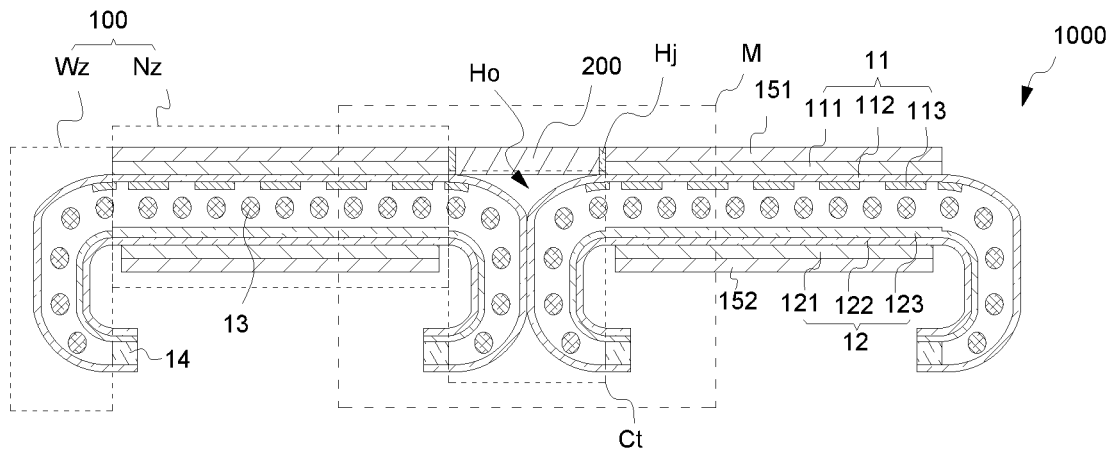
FIG. 1 is a first structural schematic view showing a spliced panel provided by an embodiment of the present disclosure.

Hereinafter preferred embodiments of the present disclosure will be described with reference to the accompanying drawings to exemplify the embodiments of the present disclosure can be implemented, which can fully describe the technical contents of the present disclosure to make the technical content of the present disclosure clearer and easy to understand. However, the described embodiments are only some of the embodiments of the present disclosure, but not all of the embodiments. All other embodiments obtained by those skilled in the art based on the embodiments of the present disclosure without creative efforts are within the scope of the present disclosure. Embodiments, which are based on the embodiments of the present disclosure, obtained by those skilled in the art without making any inventive efforts are within the scope of protection defined by the present disclosure. It should be noted that described embodiments are merely used to construct the present disclosure and are not intended to limit the present disclosure. In the present disclosure, unless further description is made, terms such as "top" and "bottom" usually refer to a top of a device and a bottom of a device in an actual process or working status, and specifically, to the orientation as shown in the drawings. Terms such as "inside" and "outside" are based on an outline of a device.

An embodiment of the present provides a spliced panel which is described in detail below. It should be noted that a following description order of embodiments does not denote a preferred description order of the embodiments.

It should be noted that a spliced panel 1000 provided by embodiments of the present disclosure as shown in FIGS. 1 to 4 includes two display panels disposed in a middle area. This is only an example, and the embodiments are not limited thereto.

Figure 2:
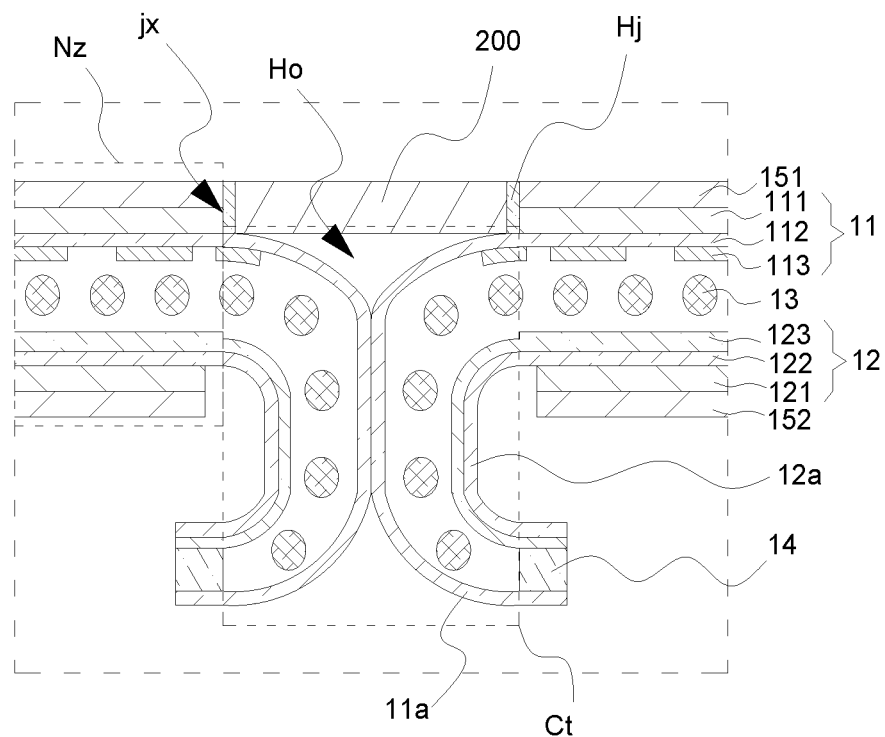
FIG. 2 is an enlarged view of an M part of FIG. 1.

Please refer to FIG. 1 and FIG. 2, an embodiment of the present disclosure provides the spliced panel 1000, including at least two display panels 100 and a light-emitting diode (LED) substrate 200.

The at least two display panels 100 are spliced to each other. Each of the at least two display panels 100 includes a bending part Wz and a non-bending part Nz. The bending part Wz is bent from a side of the non-bending part Nz to a back surface of the at least two display panels 100. The non-bending part Nz is configured to display an image.

In the at least two display panels 100 spliced to each other, the bending part Wz of one of the at least two display panels 100 is correspondingly spliced to the bending part Wz of another of the at least two display panels 100 to form a support structure Ct.

The LED substrate 200 is disposed on the support structure Ct.

In the spliced panel 1000 provided by the present embodiment, part of each of the at least two display panels 100 is bent to form the bending part Wz. Two bending parts Wz are spliced to each other to form the support structure Ct. Then, the LED substrate 200 is disposed on the support structure Ct to cover a splicing gap, thereby preventing the splicing gap from being viewed. In addition, a non-display functional layer of each of the at least two display panels 100 is bent to the back surface of the at least two display panels 100, thereby narrowing a frame.

It should be noted that the back surface of the display panel 100 is opposite to a display side of the display panel 100. That is, the display side of the display panel 100 is a front surface.

Optionally, the LED substrate 200 may be a mini LED panel, a micro LED panel, an organic light-emitting diode (OLED) panel, or a quantum-dot light-emitting diode (QLED) panel.

Optionally, the non-bending part Nz is higher than the support structure Ct. In the at least two display panels 100 spliced to each other, a surface of two non-bending parts Nz and a surface of the support structure Ct form a recess Ho. The LED substrate 200 is disposed in the recess Ho.

The recess Ho is formed by splicing. The LED substrate 200 is disposed in the recess Ho, thereby improving flatness of the spliced panel 1000.

Optionally, a lateral surface of the LED substrate 200 is connected to the non-bending part Nz by a black adhesive Hj.

The black adhesive Hk is disposed between the lateral surface of the LED substrate 200 and the non-bending part Nz. Therefore, not only can the LED substrate 200 be stably disposed in the recess Ho, but also a light-shielding effect can be improved. As such, a display contrast can be enhanced.

In some embodiments, the lateral surface of the LED substrate 200 can be connected to the non-bending part Nz by a non-black adhesive.

Optionally, in the spliced panel 1000 having a first structure provided by the present embodiment, the at least two display panels 100 are LCD panels, which is taken as a description example.

Each of the at least two display panels 100 includes a first substrate 11 and a second substrate 12 disposed on the first substrate 11.

Each of the at least two display panels 100 further includes a liquid crystal 13 and a frame sealant 14. The liquid crystal 13 and the frame sealant 14 are disposed between the first substrate 11 and the second substrate 12. The frame sealant 14 is disposed surrounding the liquid crystal 13. The non-bending part Nz includes the liquid crystal 13.

The first substrate 11 includes a first base 111 and a first flexible layer 112. The first flexible layer 112 is disposed on a surface of the first base 111 facing the second substrate 12. The first flexible layer 112 includes a first sub-layer 11a protruding from the first base 111. The first sub-layer 11a is bent to be part of the bending part Wz.

In the at least two display panels 100 spliced to each other, a lateral surface of two first bases 111 and a surface of two first sub-layers 11a form the recess Ho.

Optionally, the second substrate 12 includes a second base 121, a second flexible layer 122, and a driving circuit layer 123. The second flexible layer 122 is disposed on a surface of the second base 121 facing the first substrate 11. The driving circuit layer 123 is disposed on a surface of the second flexible layer 122 facing the first substrate 11. The second flexible layer 122 includes a second sub-layer 12a protruding from the second base 121. Part of the driving circuit layer 123 corresponding to the second sub-layer 12a and the second sub-layer 12a are bent to be part of the bending part Wz.

Optionally, in a side of the non-bending part Nz close to the bending part Wz, part of the first base 111 protrudes the second base 121, thereby reducing a bending radius of the bending part Wz.

It should be noted that a bending side is the at least two display panels 100.

Optionally, the bending part Wz includes the liquid crystal 13.

That is, part of each of the at least two display panels 100 originally disposed in a display area are the bending part Wz, thereby narrowing a frame. In addition, by setting part of the display area of the at least two display panels 100 to be the bending part Wz, a bending radius of the bending part Wz can be reduced.

Optionally, the second base 12 may be a simple array substrate, or may be a color filter on array (COA) substrate. The driving circuit layer 123 may include a scan line, a data line, a thin-film transistor (TFT), a capacitor, and a pixel electrode, which are disposed on the second flexible layer 122. Part of the TFT is electrically connected to the pixel electrode.

Optionally, the first base 111 and the second base 112 may be a rigid base or a flexible base. In the present embodiment, the first base 111 and the second base 112 are the rigid base such as glass, sapphire, or silicon.

Optionally, a material of the first flexible layer 112 and a material of the second flexible layer 122 may be selected from one of polystyrene, polylactic acid, polyethylene dicarboxylate, polyethylene terephthalate, polyethylene naphthalate, polycarbonate, polyethersulfone, aromatic fluorine containing polyarylate toluene, polycyclic olefin, polyimide, or polyurethane.

Optionally, the first substrate 11 further includes a black matrix layer 113 disposed on a surface of the first flexible layer 112 facing the second substrate 12. A gap jx is defined between the LED substrate 200 and the first base 111.

Part of the black matrix layer 113 covers the gap jx.

Because the bending part Wz is part of the display area, when the at least two display panels 100 display, the bending part Wz may also display and emit light. The LED substrate 200 is disposed on the support structure Ct, thereby blocking light emitted from the bending part Wz. The gap jx between the LED substrate 200 and the first base 111 is covered by the black matrix layer 113, thereby preventing light leakage.

Optionally, each of the at least two display panels 100 further includes a first polarizer 151 and a second polarizer 152. The first polarizer 151 is disposed on a surface of the first base 111 away from the second substrate 12. The second polarizer 152 is disposed on a surface of the second base 121 away from the first substrate 11.

Figure 3:
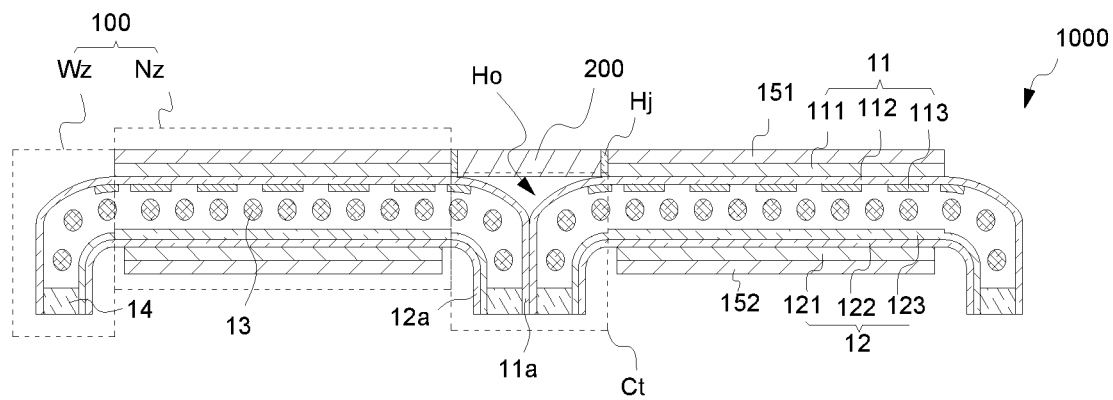
FIG. 3 is a second structural schematic view showing a spliced panel provided by an embodiment of the present disclosure.

Please refer to FIG. 3. Optionally, differences between an embodiment as shown in FIG. 3 and the above embodiment are: in the present embodiment, the bending part Wz further includes the frame sealant 14. That is, both the liquid crystal 13 and the frame sealant 14 are disposed in the bending part Wz. This structure can increase enlarge the display area of the at least two display panels 100.

Figure 4:
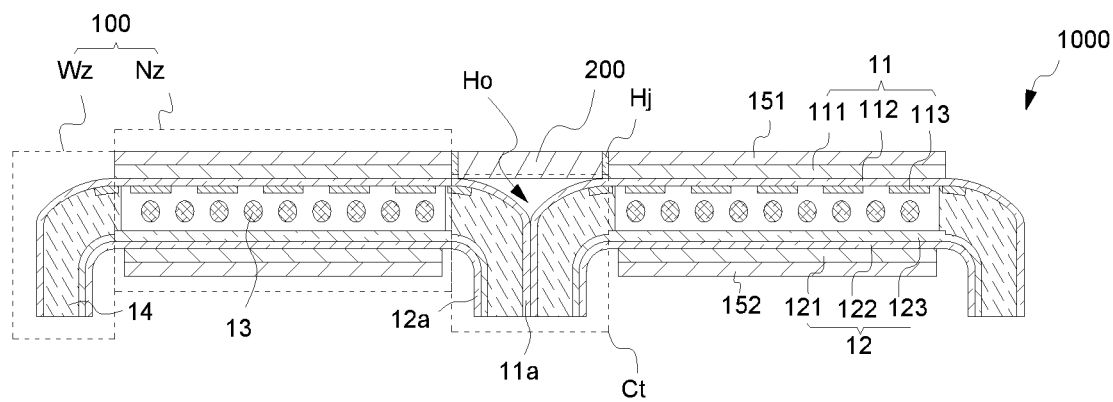
FIG. 4 is a third structural schematic view showing a spliced panel provided by an embodiment of the present disclosure.

Please refer to FIG. 4. Optionally, differences between an embodiment as shown in FIG. 4 and the above embodiments are: in the present embodiment, the bending part Wz includes the frame sealant 14, but does not include the liquid crystal 13. That is, in the present embodiment, only part of a non-display area of the spliced panel 1000 is bent. Therefore, the display area of the at least two display panels 100 is increased, thereby further reducing a risk of light leakage of the spliced panel 1000.

A method of manufacturing the spliced panel 1000 of the present embodiment is described below. The at least two display panels 100 are LCD panels, which is taken as a description example. However, the present disclosure is not limited thereto.

Figure 5:
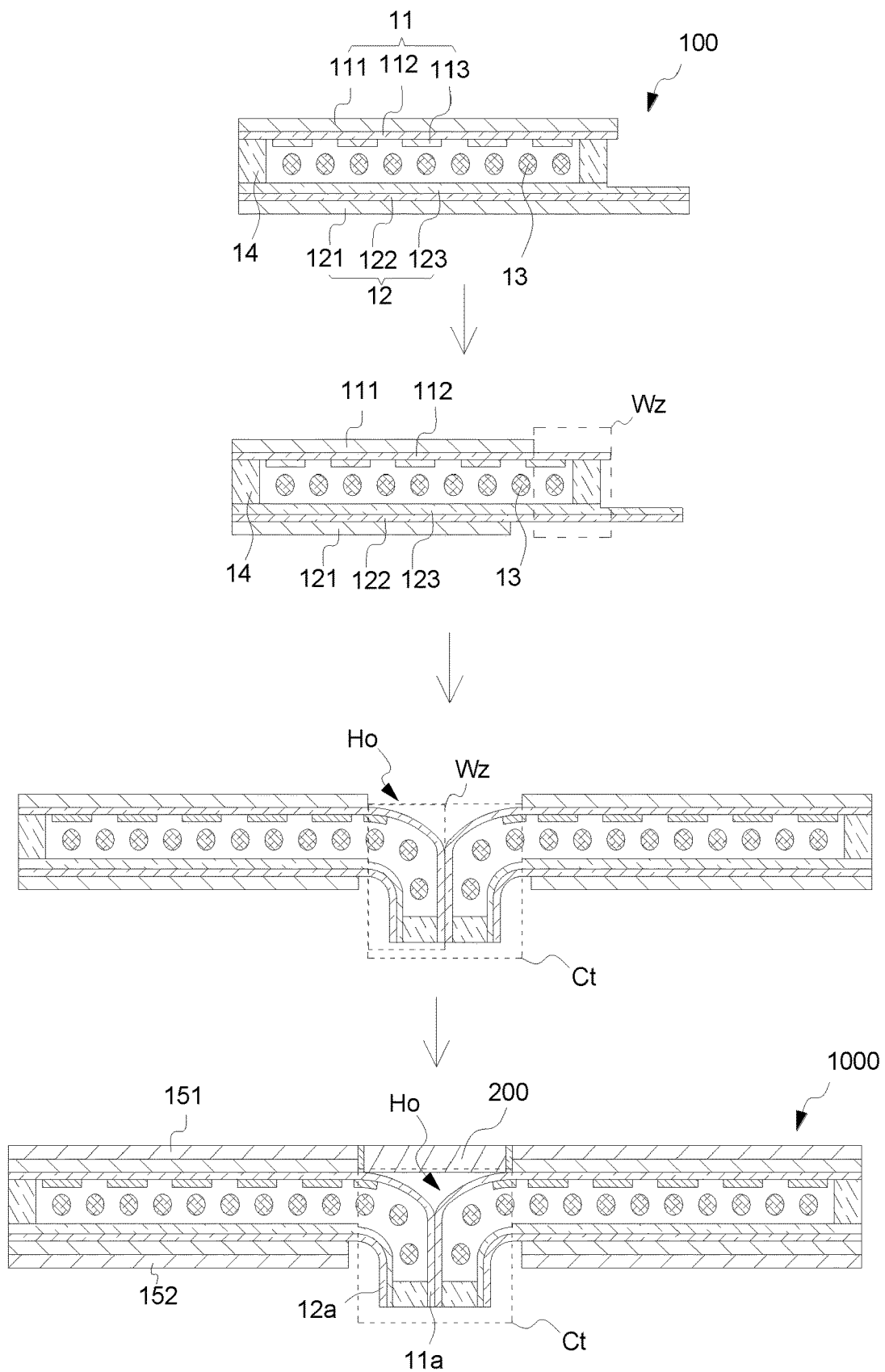
FIG. 5 is a schematic flowchart showing a method of manufacturing a spliced panel provided by an embodiment of the present disclosure.

Please refer to FIG. 5, in the method of manufacturing the spliced panel 1000 provided by the present embodiment, the spliced panel 1000 includes two display panels 100 spliced to each other. However, the present disclosure is not limited thereto. The method of manufacturing the spliced panel 1000 includes following steps:

Step B1, providing at least two display panels. Each of the at least two display panels includes a first substrate 11 and a second substrate 12 disposed on the first substrate 11. Each of the at least two display panels 100 further includes a liquid crystal 13 and a sealant 14. The liquid crystal 13 and the sealant 14 are disposed between the first substrate 11 and the second substrate 12. The sealant 14 is disposed surrounding the liquid crystal 13 to encapsulate the liquid crystal 13. The first substrate 11 includes a first base 111 and a first flexible layer 112. The first flexible layer 112 is disposed on a surface of the first base 111 facing the second substrate 12. The second substrate 12 includes a second base 121, a second flexible layer 122, and a driving circuit layer 123. The second flexible layer 122 is disposed on a surface of the second base 121 facing the first substrate 11. A driving circuit layer 123 is disposed on a surface of the second flexible layer 122 facing the first substrate 11.

Step B2, respectively cutting part of the first base 111 and part of the second base 121, which correspond to a bending area, thereby making part of the at least two panels 100 corresponding to the bending area form a bending part Wz that is unfolded.

Step B3, bending the bending part Wz, thereby folding the bending part Wz, and correspondingly splicing the bending parts Wz of the at least two display panels 100 to each other to form a support structure Ct.

Step B4, disposing an LED substrate 200 on the support Ct, thereby covering a splicing gap between two bending parts Wz.

Finally, the method of manufacturing the spliced panel 1000 provided by the present embodiment is completed.

Figure 6:
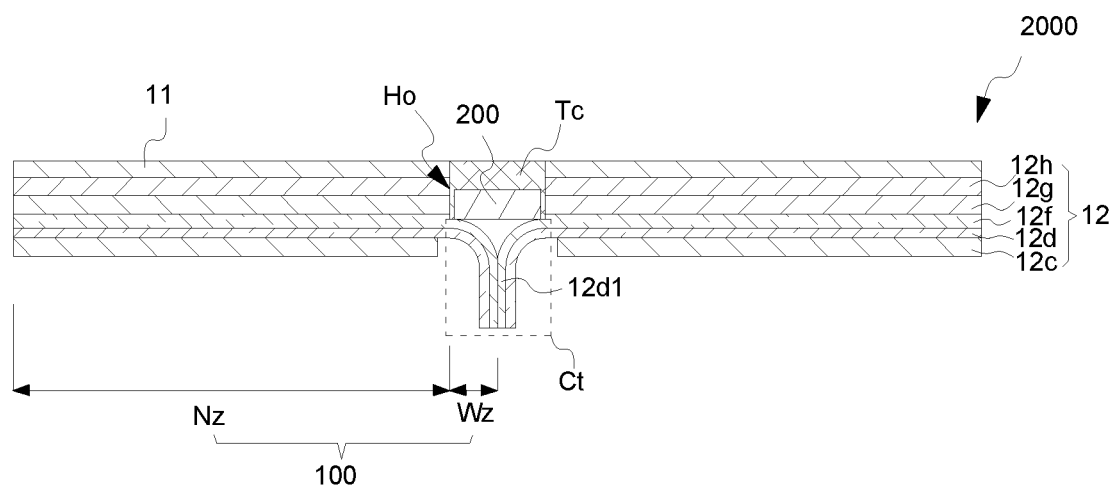
FIG. 6 is a fourth structural schematic view showing a spliced panel provided by an embodiment of the present disclosure.

Please refer to FIG. 6. Optionally, in some embodiments, the present embodiment provides a spliced panel 2000, including at least two display panels 100 and an LED substrate 200.

The at least two display panels 100 are spliced to each other. Each of the at least two display panels 100 includes a bending part Wz and a non-bending part Nz. The bending part Wz is bent from a side of the non-bending part Nz to a back surface of the display panels 100. The non-bending part Nz is configured to display an image.

In the at least two display panels 100 spliced to each other, the bending part Wz of one of the at least two display panels 100 is correspondingly spliced to the bending part Wz of another of the at least two display panels 100 to form a support structure Ct.

The LED substrate 200 is disposed on the support structure Ct.

In the spliced panel 2000 provided by the present embodiment, part of each of the at least two display panels 100 is bent to form the bending part Wz. Two bending parts Wz are spliced to each other to form the support structure Ct. Then, the LED substrate 200 is disposed on the support structure Ct to cover a splicing gap, thereby preventing the splicing gap from being viewed. In addition, a non-display functional layer of each of the at least two display panels 100 is bent to the back surface of the at least two display panels 100, thereby narrowing a frame.

It should be noted that the back surface of the display panel 100 is opposite to a display side of the display panel 100. That is, the display side of the display panel 100 is a front surface.

Optionally, the LED substrate 200 may be a mini LED panel, a micro LED panel, an organic light-emitting diode (OLED) panel, or a quantum-dot light-emitting diode (QLED) panel.

Optionally, the non-bending part Nz is higher than the support structure Ct. In the at least two display panels 100 spliced to each other, a surface of two non-bending parts Nz and a surface of the support structure Ct form a recess Ho. The LED substrate 200 is disposed in the recess Ho.

The recess Ho is formed by splicing. The LED substrate 200 is disposed in the recess Ho, thereby improving flatness of the spliced panel 2000.

Optionally, a lateral surface of the LED substrate 200 is connected to the non-bending part Nz by a black adhesive Hj.

Optionally, each of the at least two display panels 100 includes a first substrate 11 and a second substrate 12 disposed on the first substrate 11. The first substrate 11 is a cover plate. The second substrate 12 includes a base 12c, and a flexible layer 12d, a driving circuit layer 12f, a display functional layer 12g, and an encapsulation layer 12h, which are sequentially disposed on the base 12c. The first substrate 11 is disposed on the display functional layer 12g. The flexible layer 12d includes a sub-layer 12d1 protruding from the base 12c.

Optionally, the display functional layer 12g includes a first electrode, a light-emitting layer, and a second electrode. Optionally, a material of the light-emitting layer may be an organic material or a quantum-dot material.

The base 12c, part of the flexible layer 12d, part of the driving circuit layer 12f, the display functional layer 12g, and the first substrate 11 are part of the non-bending part Nz. Part of the driving circuit layer 12f corresponding to the sub-layer 12d1 and the sub-layer 12d1 are bent to be part of the bending part Wz.

In the at least two display panels 100 spliced to each other, an upper surface of the driving circuit layer 12f, a lateral surface of two encapsulation layers 12h, and a lateral surface of two first substrates 11 form the recess Ho.

Compared with the above embodiments, the spliced panel of the present embodiment uses LED panels as the at least two display panels 100. Therefore, it is allowed to only cut part of the base 12c corresponding to the bending area, thereby simplifying manufacturing steps.

In the present embodiment, the recess Ho has a greater depth. The LED substrate 200 is disposed in the recess Ho, thereby improving flatness of the spliced panel 2000.

In addition, a depth of the recess Ho is greater than a thickness of the LED substrate 200. Therefore, a filling adhesive Tc is filled in the recess Ho to cover the LED substrate 200, thereby protecting and fixing the LED substrate 200.

Optionally, a refractive index of the filling adhesive Tc is equal to a refractive index of the first substrate 11, thereby reducing a difference between an image displayed by the LED substrate 200 and an image displayed by the at least two display panels 100.

In the spliced panel provided by the present embodiment, each of the at least two display panels is bent to form the bending part, and two bending parts are spliced to each other to form the support structure. Then, the LED substrate is disposed on the support structure, thereby covering a splicing gap. Therefore, the splicing gap will not be viewed. In addition, a non-display functional layer of each of the at least two display panels is bent to the back surface of the at least two display panels, thereby narrowing a frame.

A spliced panel provided by embodiments of the present disclosure has been described in detail in terms of principles and implementations thereof. However, the description of the above embodiments is only for helping to understand the technical solution of the present disclosure and core ideas thereof, and it is understood by those skilled in the art that many changes and modifications to the described embodiment can be carried out without departing from the scope and the spirit of the disclosure that is intended to be limited only by the appended claims.

What is claimed is:

1. A spliced panel, comprising:
    at least two display panels spliced to each other, wherein each of the at least two display panels comprises a bending part and a non-bending part, the bending part is bent from a side of the non-bending part to a back surface of the display panel, the non-bending part is configured to display an image, the bending part of one of the at least two display panels and the bending part of another of the at least two display panels are correspondingly spliced to each other to form a support structure, each of the at least two display panels comprises a first substrate and a second substrate disposed on the first substrate, the first substrate comprises a first base, and the first base is a rigid base or a flexible base; and
    a light-emitting diode (LED) substrate disposed on the support structure;
    wherein the non-bending part is higher than the support structure, a surface of the non-bending part of the at least two display panels spliced to each other and a surface of the support structure form a recess, and the LED substrate is disposed in the recess;
    wherein the first substrate comprises a first flexible layer, the first flexible layer is disposed on a surface of the first base facing the second substrate, the first flexible layer comprises a first sub-layer protruding from the first base, and the first sub-layer is bent to be part of the bending part; and
    a lateral surface of the first base of the at least two display panels spliced to each other and a surface of the first sub-layer of the at least two display panels spliced to each other to form the recess.

2. The spliced panel of claim 1, wherein a lateral surface of the LED substrate is connected to the non-bending part by a black adhesive.

3. The spliced panel of claim 1, wherein the second substrate comprises a second base, a second flexible layer is disposed on a surface of the second base facing the first substrate, a driving circuit layer is disposed on a surface of the second flexible layer facing the first substrate, the second flexible layer comprises a second sub-layer protruding from the second base, and part of the driving circuit layer corresponding to the second sub-layer and the second sub-layer are bent to be part of the bending part.

4. The spliced panel of claim 3, wherein each of the at least two display panels comprises a liquid crystal and a frame sealant, the liquid crystal and the sealant are disposed between the first substrate and the second substrate, the frame sealant is disposed surrounding the liquid crystal to encapsulate the liquid crystal, and the non-bending part comprises the liquid crystal.

5. The spliced panel of claim 4, wherein the bending part comprises the liquid crystal.

6. A spliced panel, comprising:
    at least two display panels spliced to each other, wherein each of the at least two display panels comprises a bending part and a non-bending part, the bending part is bent from a side of the non-bending part to a back surface of the display panel, the non-bending part is configured to display an image, and the bending part of one of the at least two display panels and the bending part of another of the at least two display panels are correspondingly spliced to each other to form a support structure; and
    a light-emitting diode (LED) substrate disposed on the support structure;
    wherein the non-bending part is higher than the support structure, a surface of the non-bending part of the at least two display panels spliced to each other and a surface of the support structure form a recess, and the LED substrate is disposed in the recess;
    wherein each of the at least two display panels comprises a first substrate and a second substrate disposed on the first substrate, the first substrate comprises a first base, the first substrate comprises a first flexible layer, the first flexible layer is disposed on a surface of the first base facing the second substrate, the first flexible layer comprises a first sub-layer protruding from the first base, and the first sub-layer is bent to be part of the bending part; and a lateral surface of the first base of the at least two display panels spliced to each other and a surface of the first sub-layer of the at least two display panels spliced to each other to form the recess.

7. The spliced panel of claim 6, wherein a lateral surface of the LED substrate is connected to the non-bending part by a black adhesive.

8. The spliced panel of claim 6, wherein the second substrate comprises a second base, a second flexible layer is disposed on a surface of the second base facing the first substrate, a driving circuit layer is disposed on a surface of the second flexible layer facing the first substrate, the second flexible layer comprises a second sub-layer protruding from the second base, and part of the driving circuit layer corresponding to the second sub-layer and the second sub-layer are bent to be part of the bending part.

9. The spliced panel of claim 8, wherein each of the at least two display panels comprises a liquid crystal and a frame sealant, the liquid crystal and the sealant are disposed between the first substrate and the second substrate, the frame sealant is disposed surrounding the liquid crystal to encapsulate the liquid crystal, and the non-bending part comprises the liquid crystal.

10. The spliced panel of claim 9, wherein the bending part comprises the liquid crystal.

11. The spliced panel of claim 10, wherein the bending part comprises the frame sealant.

12. The spliced panel of claim 9, wherein the bending part comprises the sealant and does not comprise the liquid crystal.

13. The spliced panel of claim 10, wherein the first substrate comprises a black matrix layer disposed on a surface of the first flexible layer facing the second substrate, and a gap is defined between the LED substrate and the first base; and part of the black matrix layer covers the gap.

14. The spliced panel of claim of 13, wherein the black matrix layer extends from a region where the non-bending part is located to a region where the bending part is located, and the black matrix layer is overlapped with the LED substrate.

15. A spliced panel, comprising:

at least two display panels spliced to each other, wherein each of the at least two display panels comprises a bending part and a non-bending part, the bending part is bent from a side of the non-bending part to a back surface of the display panel, the non-bending part is configured to display an image, and the bending part of one of the at least two display panels and the bending part of another of the at least two display panels are correspondingly spliced to each other to form a support structure; and a light-emitting diode (LED) substrate disposed on the support structure;

wherein the non-bending part is higher than the support structure, a surface of the non-bending part of the at least two display panels spliced to each other and a surface of the support structure form a recess, and the LED substrate is disposed in the recess;

wherein, the first substrate is a cover plate, the second substrate comprises a second base, and a second flexible layer, a driving circuit layer, a display functional layer, and an encapsulation layer sequentially disposed on the second base, the first substrate is disposed on the display functional layer, and the second flexible layer comprises a second sub-layer protruding from the second base;

the second base, part of the second flexible layer, part of the driving circuit layer, part of the display functional layer, part of the encapsulation layer, and the first substrate are part of the non-bending part, and part of the driving circuit layer corresponding to the second sub-layer and the second sub-layer are bent to be part of the bending part; and in the at least two display panels spliced to each other, an upper surface of two driving circuit layers, a lateral surface of two encapsulation layers, and a lateral surface of two first substrates form the recess.

16. The spliced panel of claim 15, wherein a depth of the recess is greater than a thickness of the LED substrate, and a filling adhesive is filled in the recess and covers the LED substrate.

17. The spliced panel of claim 16, wherein a refractive index of the filling adhesive is equal to a refractive index of the first substrate.

* * * * *